July 16, 1940. J. L. FRANKLIN 2,207,855
PHONOGRAPHIC ANNOUNCING MECHANISM AND SYSTEM
Filed Dec. 3, 1938 13 Sheets-Sheet 2

Inventor
John L. Franklin
By Brown & Phelps
Attorneys

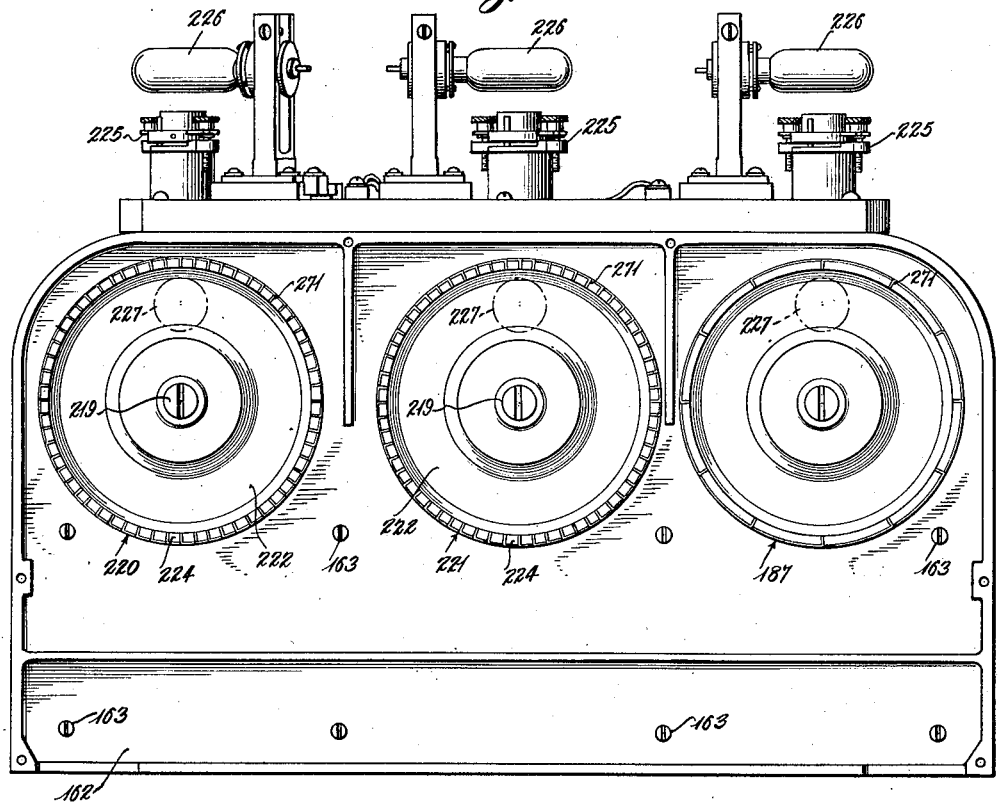
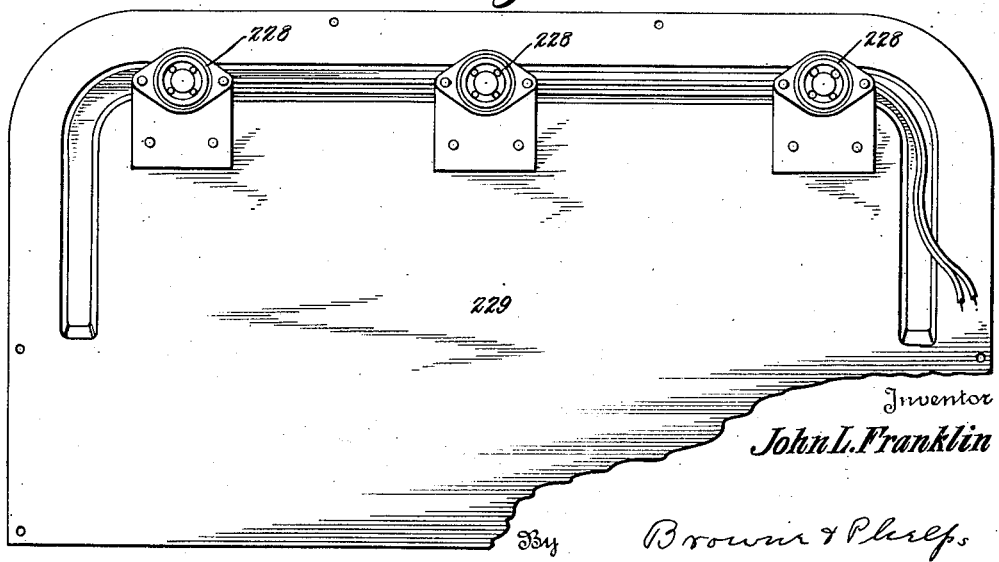

July 16, 1940.  J. L. FRANKLIN  2,207,855
PHONOGRAPHIC ANNOUNCING MECHANISM AND SYSTEM
Filed Dec. 3, 1938  13 Sheets-Sheet 5
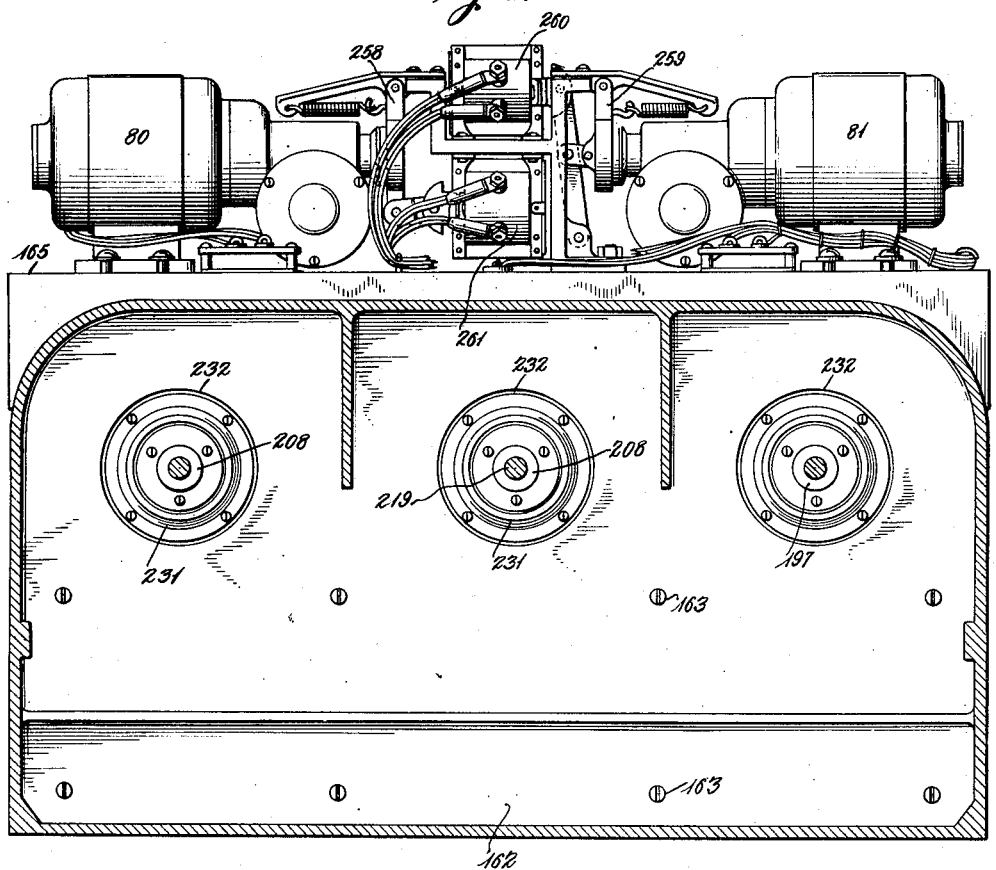
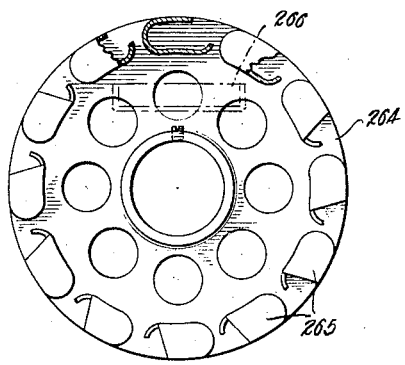
Inventor
John L. Franklin
By Brown + Phelps
Attorneys July 16, 1940. J. L. FRANKLIN 2,207,855
PHONOGRAPHIC ANNOUNCING MECHANISM AND SYSTEM
Filed Dec. 3, 1938 13 Sheets-Sheet 6

Inventor
John L. Franklin
By Brown & Phelps
Attorneys

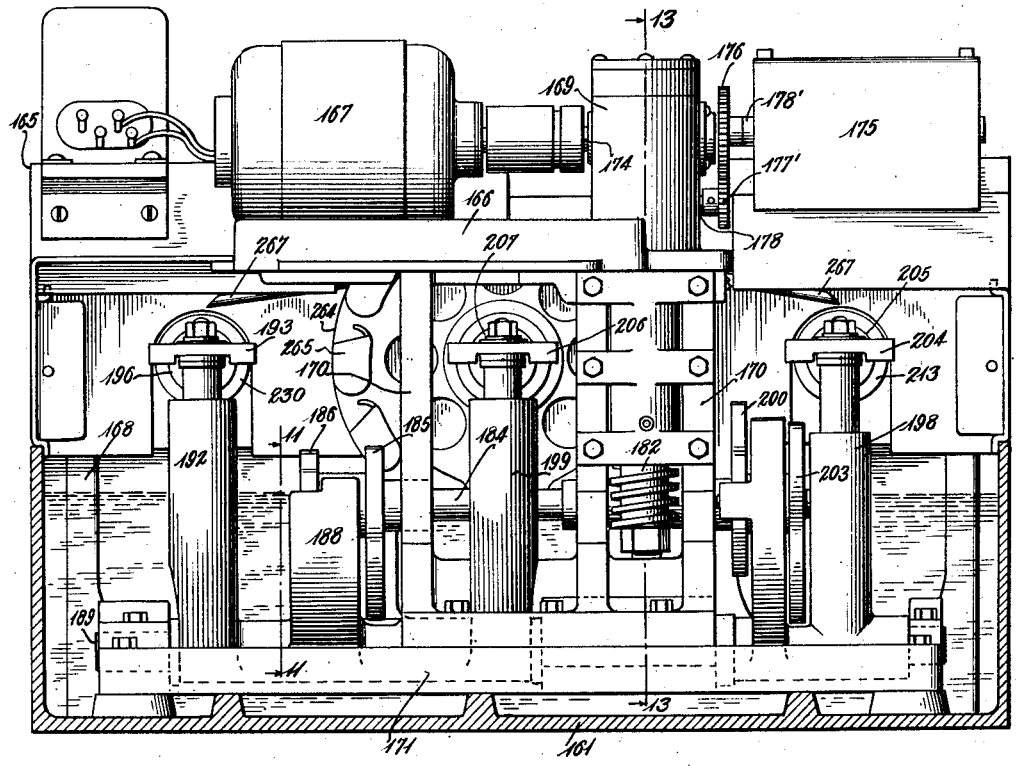
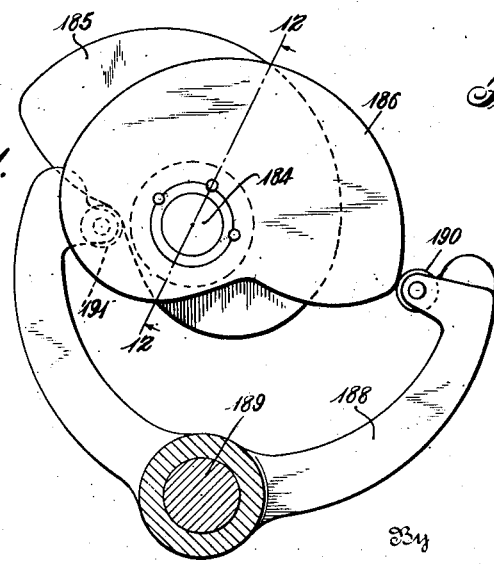
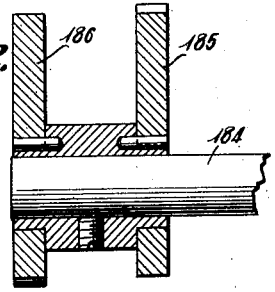

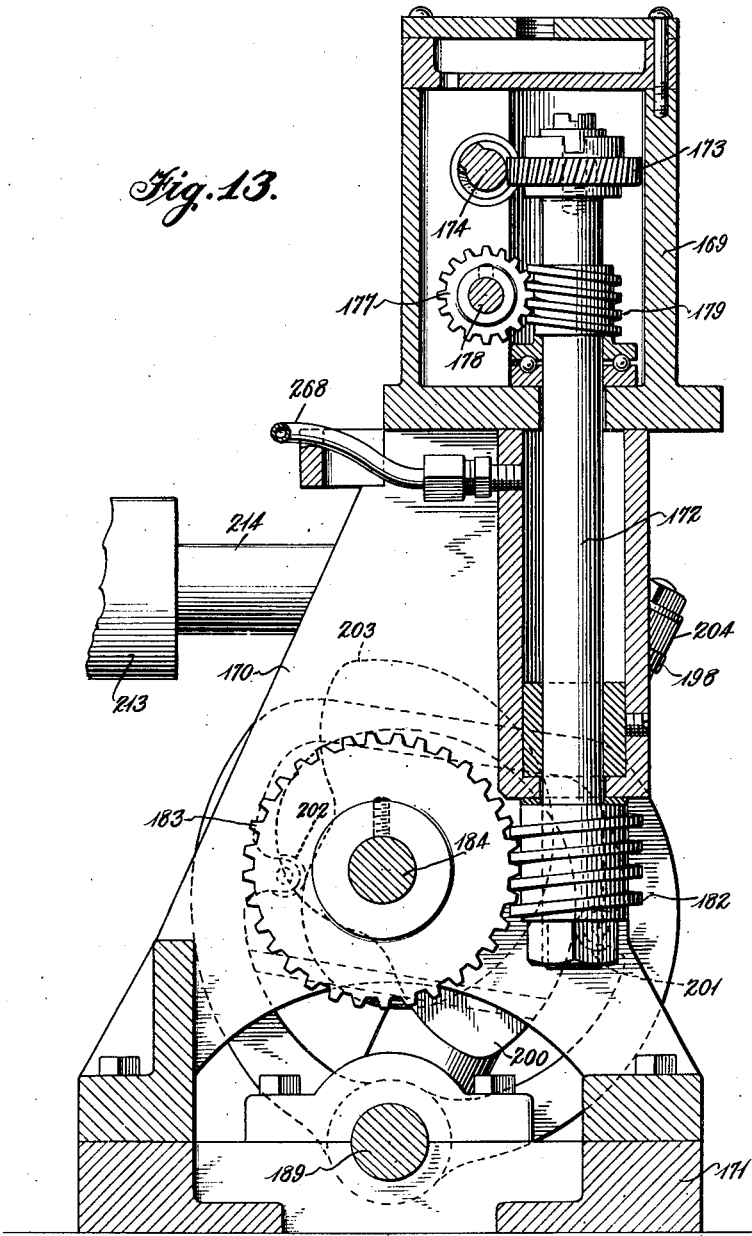

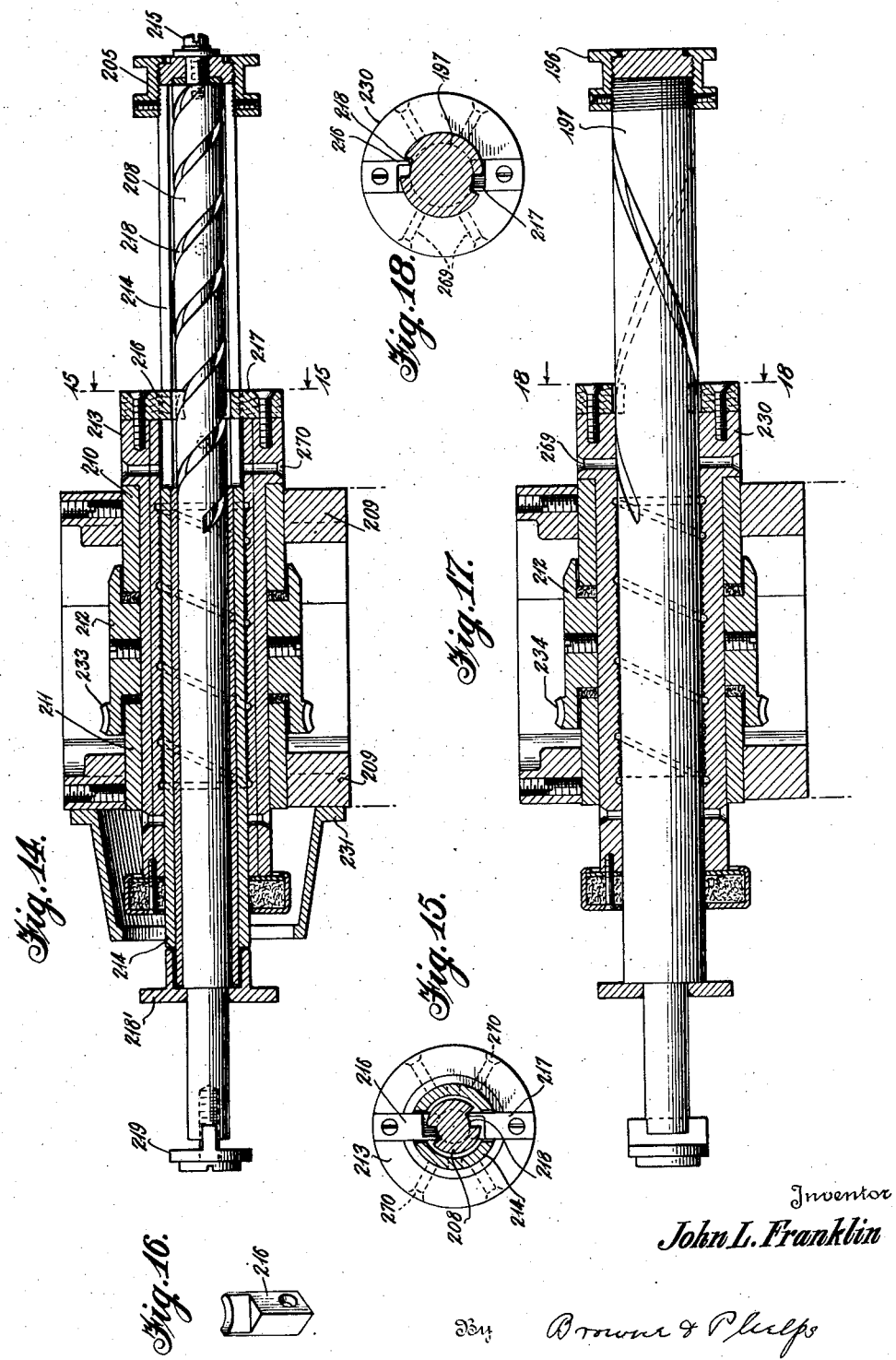

July 16, 1940. J. L. FRANKLIN 2,207,855
PHONOGRAPHIC ANNOUNCING MECHANISM AND SYSTEM
Filed Dec. 3, 1938 13 Sheets-Sheet 10
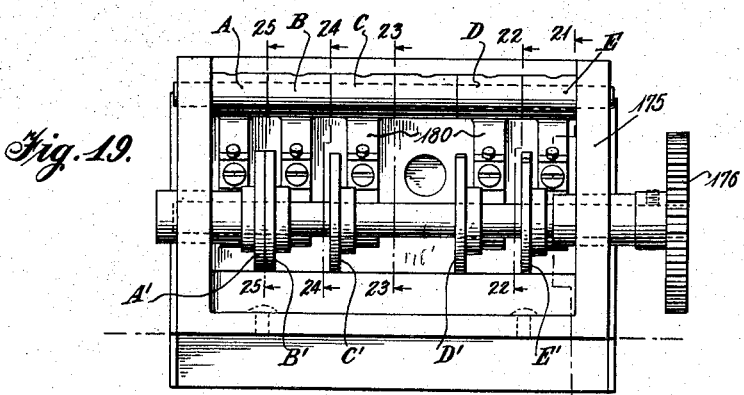
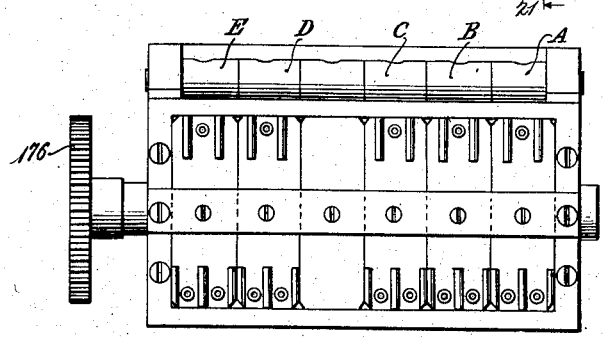
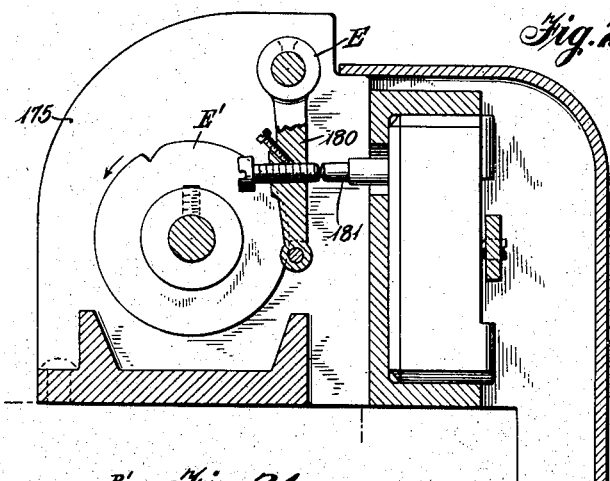
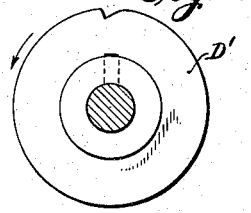
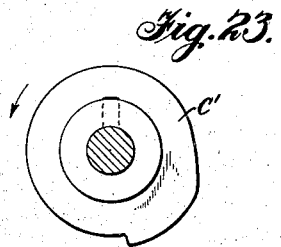
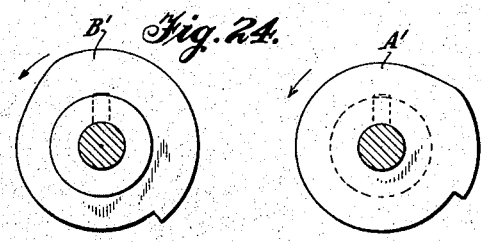
Inventor
John L. Franklin
By Brower & Phelps
Attorneys July 16, 1940.   J. L. FRANKLIN   2,207,855
PHONOGRAPHIC ANNOUNCING MECHANISM AND SYSTEM
Filed Dec. 3, 1938   13 Sheets-Sheet 11

Inventor
John L. Franklin
By Brower & Phelps
Attorneys

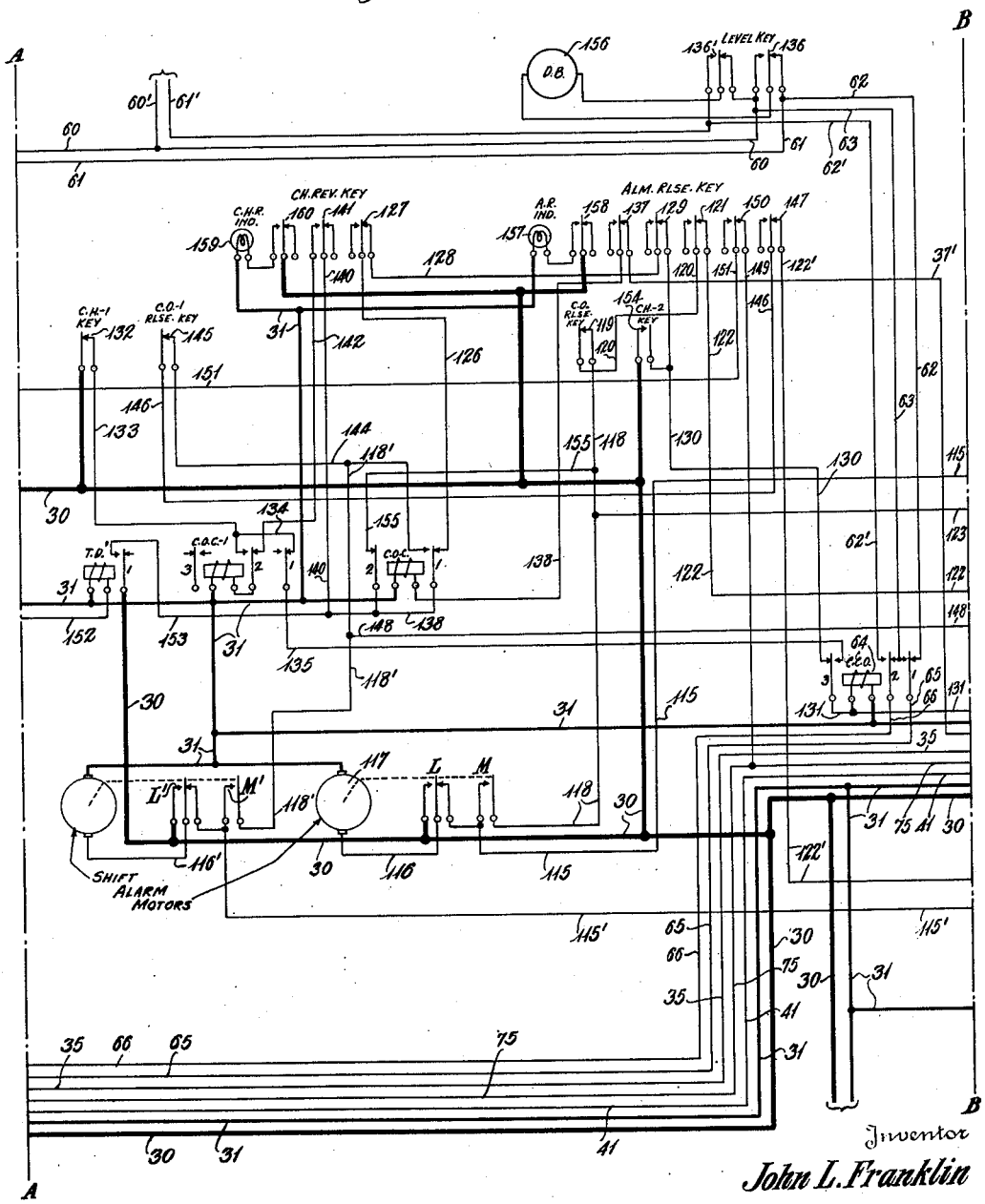

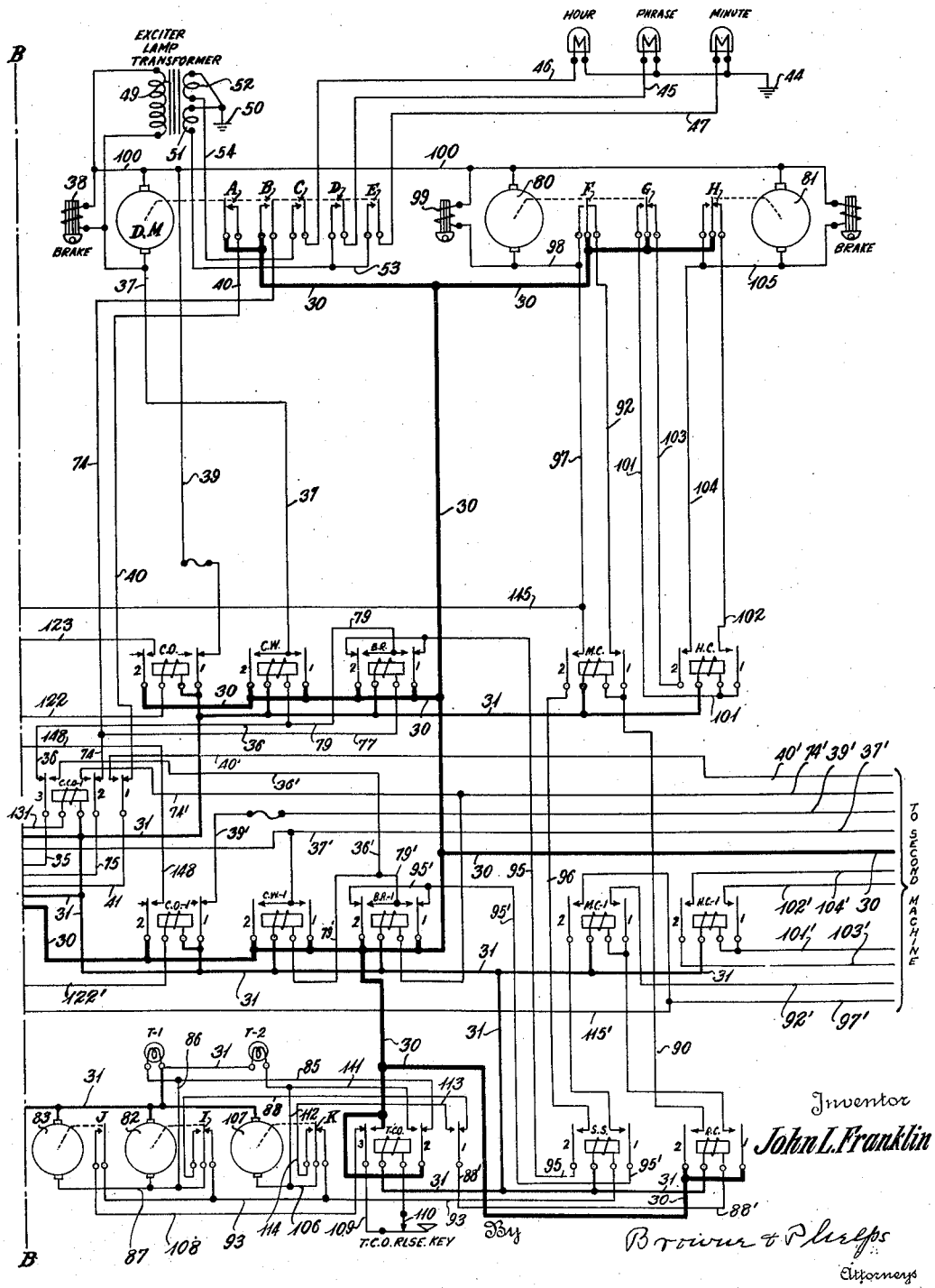

Patented July 16, 1940

2,207,855

UNITED STATES PATENT OFFICE 2,207,855

PHONOGRAPHIC ANNOUNCING MECHANISM AND SYSTEM

John L. Franklin, Atlanta, Ga.

Application December 3, 1938, Serial No. 243,831

36 Claims. (Cl. 179—6)

The invention relates to time announcing over the telephone and has as an object the provision of a machine and a system for control of the machine for the purpose.

Among objects of the invention are: To provide a machine including three record cylinders for hour, phrase, and minute announcements, respectively, whereby the phrase cylinder may be changed when desired without disturbance of the time announcing records;

To provide a spare synchronous clock motor with means for automatically cutting in the spare and cutting out the normally operating motor upon failure of operation of the latter, or of the switch controlled thereby;

To provide a system to which two announcing machines may be connected with means for normal operation of one and for cutting it out and cutting the second into operation upon any failure of the first, with lamp indication of the change;

To provide means operated by the voice current vibrations that will cause the spare machine to be cut in if the voice current is steady for more than a certain number of seconds;

To provide means to prevent a calling party being cut in or the time records being shifted while the machine is announcing;

To improve generally upon the machine and system disclosed in Patent No. 2,011,216 granted to me under date of August 13, 1935, reissued June 13, 1939, Reissue No. 21,111.

Further objects of the invention will appear when read in connection with the accompanying drawings showing an illustrative embodiment of the invention, and wherein:

Fig. 4 is an end view from the left of Figure 1 appearing with the cover plate of Figure 1 removed, on line 4—4;

Fig. 5 is an end view of the cover plate taken on line 5—5 of Figure 1;

Fig. 6 is a vertical section on line 6—6 of Figure 1;

Fig. 7 is a detail elevation of an oil elevating disc with parts broken away;

Fig. 10 is a vertical section on line 10—10 of Figure 1;

Fig. 11 is a detail section upon an enlarged scale taken on line 11—11 of Figure 10 showing the operating cams in elevation;

Fig. 12 is a detail section on line 12—12 of Figure 11;

Fig. 13 is a vertical section on line 13—13 of Figure 10 drawn to an enlarged scale;

Fig. 14 is a central vertical section of a record operating shaft for the minute and phrase records;

Fig. 15 is a detail section on line 15—15 of Figure 14;

Fig. 16 is a perspective view of a feather for operating the record, when the shaft bearing the same is moved longitudinally;

Fig. 17 is a view similar to Figure 14 showing the hour record controlling mechanism;

Fig. 18 is a transverse section on line 18—18 of Figure 17;

Fig. 19 is a side elevation of the switch assembly;

Fig. 20 is a side elevation of the structure of Fig. 19 from the opposite side;

Figure 26:
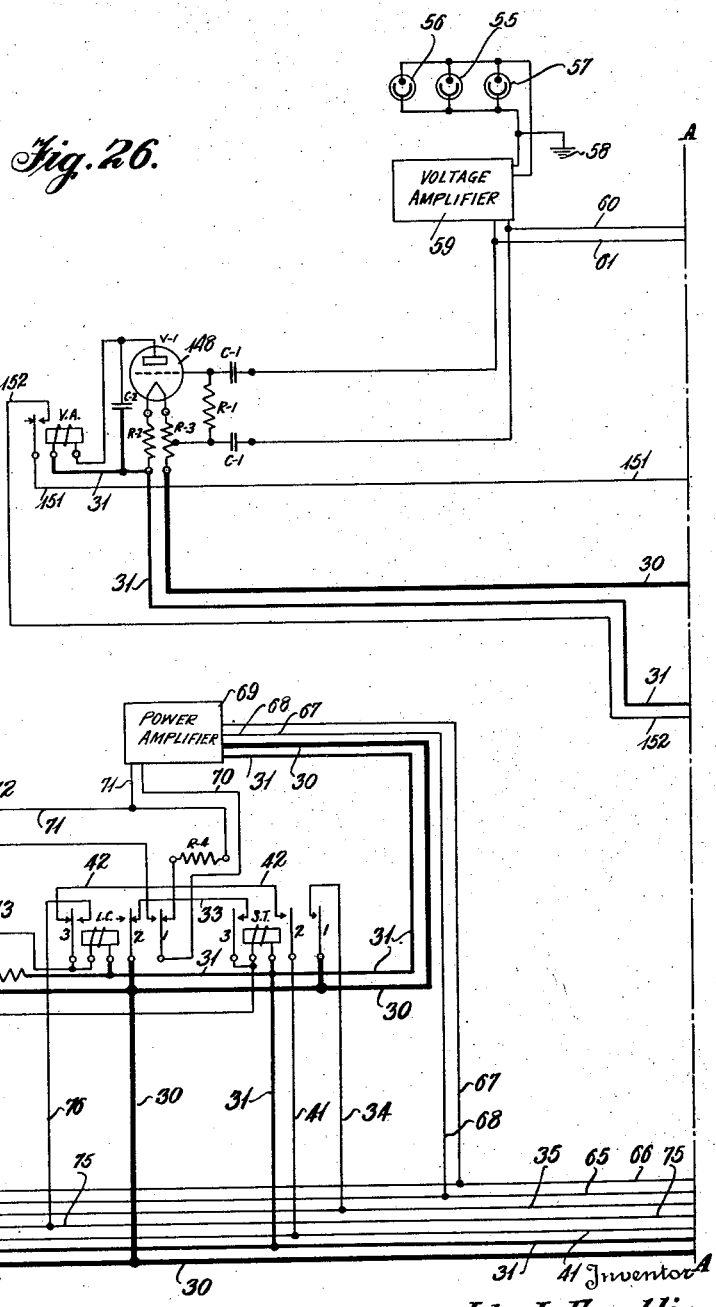

Figs. 21 to 25 inclusive are vertical transverse sections on the corresponding section lines of Figure 19;

Figs. 26, 27, and 28 are diagrams of circuits, Fig. 27 being an extension to the right of the circuit connections of Fig. 26, and Fig. 28 being an extension to the right of the circuit connections of Figure 27.

The machine of the present invention, as described below comprises three cylinders bearing photographic sound records, and a main drive motor for their operation. The main motor when operated controls switches to hold current thereon, to control a relay preserving the circuits to the calling telephones and for its own operation during a cycle and switches to control exciter lamps for the respective record. Also the machine includes a "minute motor" to shift the minute sound record and an hour motor to shift the hour record at proper intervals. The time shifting motors also control switches for their operation.

In the case of each motor in the system which controls a switch or switches, the diagrammatic showing in Figures 26-28, of the motor is connected by dotted lines with the showing of the switches controlled thereby.

The subscribers' relay "S" Figure 26 is an instrument furnished by the telephone company instead of a ringer. It is to be understood that a number of usual telephone subscribers' sets may be connected in parallel with the system, to the wires shown open at the left of Figure 26. As many as 15 sets have been so connected for perfect service.

*Normal operation*

When a call is received by one of the telephone instruments the relay S is operated, closing a circuit from power wire 30, contacts of relay S, wire 32, solenoid of start relay S. T., to return wire 31. Relay S. T. operated picks up a holding circuit from wire 30, armature 2 of make-before-break lifter control relay L. C. wire 33, armature 3 of relay S. T., the solenoid of S. T., to wire 31. Relay S. T. will therefore be held operated until relay L. C. is operated which cannot happen, as will be seen, if the announcing machine is running in response to a call from one of the telephones to the left of that shown, each telephone instrument having relays S, S. T., L. C. and phone lifter solenoids individual thereto. Relay S. T. is therefore a store relay as well as a start relay.

Operation of relay S. T. will close a circuit by its armature 1, from wire 30, over wires 34, 35, armature 3 of channel change over relay C. C. O.—1, wire 36, call waiting relay C. W. to wire 31, operating relay C. W., which relay will be held closed at all times when any relay S. T. is operated.

Relay C. W. will close a circuit from wire 30 through both its armatures, two being provided for certainty of operation, over wire 37, drive motor D. M. and solenoid brake 38, and the exciter lamp transformer 49, in parallel, wire 39, armature 1 of cut off relay C. O. to wire 31, starting motor D. M.

The switches A, B, C, D, and E are so controlled by motor D. M. that switch A closes after the motor has operated about two seconds, when the mechanism will have reached reproducing position. Immediately afterwards switch B closes and A opens. Then, with switch B still closed, switches D, C, and E open and close successively in the order named, after which switch B opens to complete the cycle.

Switch A closed completes a circuit from wire 30, over wire 40, back contact of armature 1 of make-before-break channel change over relay C. C. O.—1, wire 41, armature 2 of operated relay S. T., wire 42, back contact of armature 3 of relay L. C. (make-before-break), lifter solenoid 43 to wire 31; also closing a circuit through the solenoid of relay L. C. to wire 31 in parallel with solenoid 43, operating relay L. C. and breaking the circuit through relay S. T.

Switch B operating after the short preliminary operation of the drive motor closes a circuit from wire 30, over wire 74, back contact of armature 2, relay C. C. O.—1, wires 75, 76 front contact of armature 3 of relay L. C. which has already been operated from relay S. T. to complete a holding circuit of said relay.

Closing of switch B also completes a circuit from wire 30 over wires 74, 77, bridging relay B. R., to wire 31. Operation of relay B. R. closes a circuit from wire 30, both its front contacts, wire 79, coil of relay C. W. to wire 31 to hold relay C. W. closed for operation of the drive motor D. M.

It will be seen that if the machine is operating a cycle when relay S of any telephone is energized in response to a call, relay S. T. will lock up and close a circuit through relay C. W. in readiness for the restarting of the machine after completion of the existing activity; but such waiting called telephones cannot receive voice currents beginning at a portion of the cycle for the reason that the circuit for lifter solenoid 43 and relay L. C. is broken at switch A.

For advertising purposes it is desirable that the advertisement be spoken first in order that to learn the time the calling subscriber must wait through the advertisement. For instance, the entire spoken words may be "John Doe bakes the best dough, twelve fifty three." To this end switches D, C, and E operate and cease operation in the order named to successively close circuits through the phrase, hour and minute exciter lamps from ground 44, the lamps, wires 45, 46, 47, respectively, the switches, the exciter lamp transformer 49 to ground 50.

The secondary of transformer 49 is shown as divided into two coils 51, 52, and switches D and E connect with coil 51 over wire 53, while switch C connects with coil 52 over wire 54. As a result two consecutive exciter lamps are not energized from the same transformer coil, making for cleaner operation of the lamps, with no confusion of signals.

The phrase exciter lamp excites photoelectric cell 55, Figure 26, the hour lamp excites cell 56 and the minute lamp excites cell 57. The cells 55, 56, 57 connect through voltage amplifier 59 by wires 60, 61, wires 62, 63, armatures 1 and 2 respectively of channel change over relay C. C. O., wires 65, 66, wires 67, 68, power amplifier 69, wires 70, 71, induction coil 72 and armature 1 of operated relay L. C. Induction coil 72 is placed in influencing proximity with phone box 73 of the telephone set to induce the voice current into the telephone induction coil located in the phone box and out on the telephone line to the calling subscriber.

When switch B opens at the end of a machine cycle the holding circuit for relay L. C. over wires 74, 75, 76 is broken. Also the circuit through relay B. R. is broken and thereby the circuit through the coil of relay C. W. is broken unless some other calling telephone or telephones have their relays S. T. operated in waiting for response, in which case a circuit will exist over armature 1 of said other relay S. T. for immediate restarting of the machine.

For shifting of the minute and hour records once each minute and each hour respectively, the circuit to the minute motor 80 is controlled by its switch F, and which motor controls the hour motor 81 by its switch G, which closes once in sixty operations of the minute motor 80.

The circuits for normal operation are as follows: Current for normal operation of synchronous clock motor 82 and for synchronous alarm motor 83 is provided from wire 30 back contact of armature 2 of time change over relay T. C. O., wires 85, 86, 87, the motors in parallel, to wire 31. The switches I and J of these motors are so controlled by the motors that I will operate first, then J, then J will release, then I will release, all of which occurs in quick succession.

It will be noted that shift start control relay, S. S., will be energized at all times when switch I is in the normal condition shown in Figure 28 but without effect when minute control relays M. C. and M. C.—1 are de-energized, or when either of the bridging relays is operated.

Switch I operated will close a circuit from wire 30, armature 2 of relay T. C. O., wires 85, 86, 87 back contact of switch I, wire 88, armature 1 of relay T. C. O., wire 88', coil of time relay control R. C., to wire 31 operating relay R. C. This relay operated will close a circuit from wire 30, armature 2 of relay R. C., wire 90, coil of minute control relay M. C., to wire 31. Relay M. C. operated will close a hold-up circuit over back contact of switch F from wire 30, over wire 92, armature 1 of relay M. C., the coil of said relay to wire 31.

Switch I then opens restoring a circuit over wires 30, armature 2 of relay T. C. O., wires 85, 86, 87, switch I, wire 93, coil of shift start relay S. S., to wire 31. Relay S. S. operated closes a circuit from wire 30, back contacts of armatures of relay B. R., wire 95, armature 2 of relay S. S., wire 96, armature 2 of relay M. C., wire 97, wire 98, minute motor 80, and its brake 99, wire 100, wire 39, armature 1 of relay C. O. to wire 31.

Minute motor 80 will thus start and by operation of switch F will establish a circuit from wire 30 to the motor ensuring a full cycle of its operation until switch F returns to normal. Shifting of switch F will de-energize relay M. C. therefore the motor cannot re-start until relay R. C. is again operated and not then until B. R. is in a state of de-energization.

Should a relay S. T. and therefore relay C. W. be energized by a called telephone during a cycle of announcement, the re-starting of the machine over wires 37, 39 will not energize relay B. R. until switch A operates. There will therefore always be an interim of about one second of de-energization of relay B. R. between cycles, during which the records may be shifted.

At each sixtieth operation of the minute motor, switch G will operate closing a circuit from wire 30, blade of switch G, wire 101, coil of hour control relay H. C. to wire 31. Operation of relay H. C. will close a hold circuit for itself from wire 30, back contact of switch H, wire 102, armature 1 of relay H. C. to wire 31. Switch G returning to normal will close a start circuit for hour motor 81, from wire 30, front contact of switch G, wire 103, armature 2 of operated relay H. C., wires 104, 105, motor 81, to wire 100, 39, etc. Motor 81 starting will operate switch H closing a circuit from wire 30 through the motor and brake and de-energizing relay H. C. Motor 81 will thus complete its cycle, return switch H to normal and stop.

As will be seen from the description of the machine, minute motor 80 shifts not only the minute speaking record but the phrase speaking record as well. It will also be seen that indicator lamp T—1 is in parallel with clock motor 82 and will thus indicate the normal operation of that motor.

*Clock motor transfer*

It will be seen that when switch I stands on its back contact there will be a circuit over wire 93, back contact of switch K, wire 106, synchronous clock motor 107 to wire 31. Motor 107 will therefore run until switch K changes when it will stop with switch K standing on its front contact.

In case of failure of motor 82, or of switch I to operate, switch J operating will close a circuit from wire 30, armature 2 of relay T. C. O., wires 85, 86, switch I, wire 93, switch J, wire 108, armature 3 of relay T. C. O., wire 109, release key 110, coil of make-before-break relay T. C. O. to wire 31, operating the relay. At this time relay S. S. will remain operated.

Operation of relay T. C. O. will establish a holdup circuit for itself over its armature 3, wire 109, and its release key, will shift the circuit from wires 85, 86, switch I to wires 111, 112, switch K, from armature 2 of the relay. Also the circuit to relay R. C. over armature 1 and wire 88' will be shifted from wire 88 and switch I to wires 113, 114 and front contact of switch K.

Operation of relay T. C. O. will therefore at once supply current to motor 107 which is already standing with switch K on its front contact, will take up the control of relays S. S. over wire 93, R. C., over wire 88', and of relay M. C. at the time when switch I would have operated these relays had no failure occurred—and a minute of time will not be dropped. Operation of relay T. C. O. will also cut out of the circuit motors 82 and 83, lamp T—1, and will light lamp T—2, to indicate the change. When the attendant has removed the defect, by opening release key 110, he can restore the circuits to normal operation.

*Automatic machine-shift*

The invention includes the provision of a spare machine, a duplicate of that shown in the drawings, to be connected with the system by means of the open ends of wires shown at the right of Figure 28, together with means to shift the control circuits to the second machine upon failure of the first to operate normally.

At all times when relays M. C. and S. S. are both operated and B. R. and B. R.—1 deenergized, there is a connection from wire 30 to wire 97, through armature 2 of relay M. C. Also when motor 80 is running there is a connection of wire 97 with wire 30 through switch F. Wire 97 is connected by wire 115, switch L, wire 116, motor 117 to wire 31. Starting of motor 117 will operate switch L to provide a cycle completing circuit from wire through the operated switch L.

Switch M is operated by motor 117 at the last part of its cycle to close, then open, and motor 117 is operated with motor 80. It follows that normally switch M will not be closed while there is a connection between wires 97, 115, and wire 30 through armature of relay M. C. or through switch F.

Should switch M be closed while relays M. C. and S. S. are both operated as, for instance, by failure of switch F or should motor 80 start to "run up" another minute cycle while switch M is closed, there will be a circuit from wire 30, over wires 97, 115, switch M, wire 118, C. O., release key 119, wire 120, alarm release key 121, wire 122, coil of cutoff relay C. O. to wire 31, operating the relay and picking up its own hold-up circuit via its armature 2, from wire 30 over wire 123 to wire 118 and then over the circuit above traced.

Operation of relay C. O. will break the circuit through fused wire 39 thus cutting out the machine.

Current through switch M and wire 118 also completes a circuit over wire 155, armature 2 of cut off control relay C. O. C., wire 138, armature 1 of relay C. O. C., wire 126, ch. reverse key 127, wire 128, alarm release key 129, wire 130, armature 3 of relay C. C. O., wire 131, coils of relay C. C. O. and C. C. O.—1 in parallel to wire 31, operating relays C C. O. and C C. O.—1.

Relay C. C. O.—1 operated will shift all incoming circuits from the first machine to the spare machine which will take up the answering of incoming calls. Thus relay C. C. O.—I will substitute wire 36' for wire 36; 74' for 74; and wire 40' for wire 40.

Relay C. C. O. operated provides a hold-up circuit for relays C. C. O. and C. C. O.—I from wire 30, key 132, wires 133, 134, armature 1 of relay C. O. C.—I, wire 135, armature 3 of operated relay C. C. O., wire 131, coils of relays C. C. O. and C. C. O.—I, to wire 31. Also operated relay C. C. O. shifts armatures 1 and 2 from wires 62, 63 to wires 62', 63, thus including in the circuit of these wires, wires 60', 61', to the voltage amplifier and photo-electric cells of the spare machine, at the same time placing in parallel with this circuit key 136' instead of key 136. The spare machine is now in full connection with the controls.

Assuming that the spare machine is answering calls and the first machine has been repaired into condition for operation, when relay C. W.—I is energized to provide starting current for the drive motor of the spare machine, relay C. O. C. will be energized by current from wire 30, armature 2 of operated relay C. W.—I, the extension to the left in Figure 28 of wire 37', key 137, wire 138 to coil of relay C. O. C. This relay will always be operated when relay C. W.—I is energized.

Assuming that one of the failures above described for the first machine that closed a circuit through switch M, takes place in the spare machine, a circuit will be closed over wires 97', 115' to switch M' over wires 118', 144, key 145, wire 146, key 147, wire 122', coil of relay C. O.—I, wire 31 operating relay C. O.—I to cut out the spare machine. Operation of relay C. O.—I will close a hold-up circuit for itself from wire 30, over its front contact of armature 2, wire 148, wires 118', 144, key 145, wire 146, key 147, wire 122', coil of relay C. O.—I to wire 31, removing entire unit from the drive.

At the same time a circuit will be closed from switch M' over wire 118', back contact of armature 1 of operated relay C. O. C., wires 138, 140, key 141, wire 142, armature 2 of relay C. O. C.—I, coil of relay C. O. C.—I to wire 31 operating the relay and breaking the hold-up circuit for relays C. C. O. and C. O.—I, restoring these relays for operation of the repaired machine. This operation is dependent on manual actuation of channel reverse key 141.

Operation of relay C. O. C.—I will also close a hold-up circuit for itself from wire 30, key 132, wire 133, front contact of armature 2 of the relay, the coil of the relay to wire 31. The original machine will now be in operation and the circuits cannot be automatically shifted back to the spare machine until key 132 is opened to de-energize relays C. O. C.—I and C. O.—I.

Provision is also made for automatically changing machines upon failure of normal voice vibrations due to failure of the exciter lamps, photoelectric cells or amplifier to operate properly. To this end a three element tube is shown at 148 connected in parallel with wires 60 and 61. Connected between wire 31 and the plate of the tube is the coil of voice alarm relay V. A. Relay V. A. is normally energized by the normal plate current of tube V—I. When the machine is operating properly the voice current will cause sufficient variations in the plate current of tube V—I to cause de-energization of relay V. A., with a consequent making and breaking of a circuit from wire 30 at the machine, switch B, wires 74, 75, wire 149, key 150, wire 151, the armature of relay V. A., wire 152, coil of relay T. D. to wire 31.

Relay T. D. is slow acting. Should the machine run more than about 5 seconds without breaking of contact of the armature of V. A. and its front contact, relay T. D. will operate closing a circuit from wire 30, armature of T. D. wire 153 to coils of relay C. O. via armature 2 of relay C. O. C. and to coils of relays C. C. O. and C. C. O.—I, via armature 1 of relay C. O. C. over circuits already traced with the result of putting the spare machine into operation as already described. Should the spare machine be the one operating, the circuit closed by relay T. D. would operate over armature 1 of relay C. O. C. to wires 118', 144 in the same manner as current already described from switch M' to operate relay C. O.—I to shift control to the first machine, and to close a hold-up circuit for relay C. O. C.—I as before described, should ch. rev. key be operated.

When the circuits have been automatically shifted from the spare machine to the first machine, either by operation of relay T. D. or by operation of switch M', the system may be restored to normal position by opening key 132 to break the hold-up circuits for relays C. O. C.—I and C. O.—I, and opening key 145, to break the circuit of C. W.—I relay.

At any time when it is desired to service the first machine the circuits may be shifted to the spare machine by closing key 154, thus closing a circuit from wire 130 at the key over wire 130, to relays C. C. O. and C. C. O.—I, and over wire 130, key 129, wire 128, key 127, wire 126, armature 1 of relay C. O. C., wire 138, armature 2 of relay C. O. C., wires 155, 118, key 119, wire 120, key 121, wire 122, coil of relay C. O. to operate this relay.

When the said first machine has been serviced the circuits may be restored to it by simultaneous opening of keys 137, 129, 121, 150 and 147 and opening of key 132. Key 137 opened breaks the circuits through relay C. W.—I; key 129, the circuit through relays C. O. C.; key 121, the circuit through relay C. O.; key 150 the circuit through relay B. R.—I; and key 147 the circuit through relay C. O.—I. Key 132 being opened releases the hold-up circuit through relays C. C. O. and C. C. O.—I.

Should the failure of the spare or number two machine have shifted the number one machine into operation with consequent locking up of relays C. O.—I and C. O. C.—I the circuits may be shifted back to the number two or spare machine by opening keys 132, 145 and 119 and closing key 154, thus releasing relays C. O.—I and C. O. C.—I and closing a circuit through key 154, wire 130 to relays C. C. O. and C. C. O.—I, also by wire 130, key 129, key 127, armatures 1 and 2 of relay C. O. C., wire 155, key 119, key 121, wire 122, de-energizing relay C. O.

Armatures 2 of relays S. S. and R. C. coact with the armatures of relay M. C. to control the motors 80 and 81 of the normally operating machine. At the same time and in like manner armatures 1 of relays S. S. and R. C. are performing a like function for the spare machine. Therefore, although the spare machine will not normally perform any announcing function, its records will be shifted each minute and each hour, to be ready at any time with the correct announcement should the control circuits be automatically or manually shifted to it.

A speaker is shown at 156 in parallel with the voice circuits to enable the attendant to hear the announcements as made.

Keys 158, 137, 129, 121, 150 and 147 are connected for simultaneous actuation as are keys 160, 141, and 127. Keys 119, 132, 145, and 154 are separate key switches.

Operation of keys 137, etc., will be indicated by lamp 157 energized by key 158 and of keys 127, 141 by lamp 159, energized by key 160.

Each of relays C. C. O., C. C. O.—1, C. O. C.—1, L. C. and T. C. O. are make-before-break relays.

For convenience the stated objects of the invention and the description treat the system and the machine as separate entities yet they are not clearly separable since the circuits of the system extend into the machine and the control switches embodied in the machine form a part of the system.

Machine

A physical embodiment of a machine to be controlled by the system above described is illustrated in Figures 1 to 25 inclusive. As there shown the machine is housed in a casing comprising a reservoir member 161 having a record cylinder housing 162 secured against a face thereof as by screws 163, Figures 2 and 6, a face plate 164, Figure 2, a cover plate 165, Figure 2, and a bed 166 for support of the drive motor 167. The reservoir 161 shown as formed with ribs 168 may contain oil up to the level shown in Figures 2, 8, and 10.

To drive the machine from the drive motor 167 a reducing gearing housed in a housing 169, Figures 10 and 13, is shown supported upon standards 170 bolted to a bed 171. The device is driven through a shaft 172 driven by worm gear 173 Figure 13, which is actuated by a worm wheel 174 on the shaft of motor 167.

The switches A to E inclusive are carried in a separate housing 175 seating upon the bed 166 and may be separately removed therefrom. The said switches are driven by a gear 176, Figures 13, 19, and 20, on shaft 178', through gear 177' on shaft 178, actuated by a worm wheel 177 driven by a worm gear 179 on shaft 172, Figure 13.

Carried on the shaft 178' are cams A', Figure 28, B', Figure 24, C', Figure 23, D', Figure 22, and E', Figure 21, which drive the respective switches A to E inclusive, the shape of these cams and their relative rotational relation being shown in Figures 21 to 25 inclusive as related to a vertical line through the axes of the cams.

Each of said cams operates upon an arm 180, Figure 21, to press a spring plunger 181 to operate the respective switches.

Driven by shaft 172 through a worm wheel 182 is a gear 183 upon the shaft 184 which actuates cams 185, 186, which together actuate the hour record cylinder 187 through a link 188 mounted upon a rock shaft 189, the cams actuating the shaft 189 through rollers 190, 191 carried by the yoke. Mounted upon shaft 189 is a lever 192 carrying a yoke 193, Figure 3, having pins 194, 195 engaging a grooved disc 196 fixed upon a grooved shaft 197 to be further described. The shaft 189 is stationary and the lever 192 is movable thereon through the sleeve integral with the yoke 188.

Also rocking upon the shaft 189 are yokes connected with levers 198 and 199 for the minute record and the phrase record respectively. The levers 198 and 199 are driven by cams 200 and 203, the yokes coacting therewith being provided with rollers 201, 202, acting upon diametrically opposite portions of the cam to actuate the levers 198 and 199 both driven by a hollow sleeve on shaft 189. The lever 198 is provided with a cross head 204 to actuate a grooved disc 205 upon the hollow sleeve 214 actuating the minute motor and the lever 199 has a cross head 206 actuating a like disc 207 upon the hollow sleeve of the phrase record.

Figure 1:
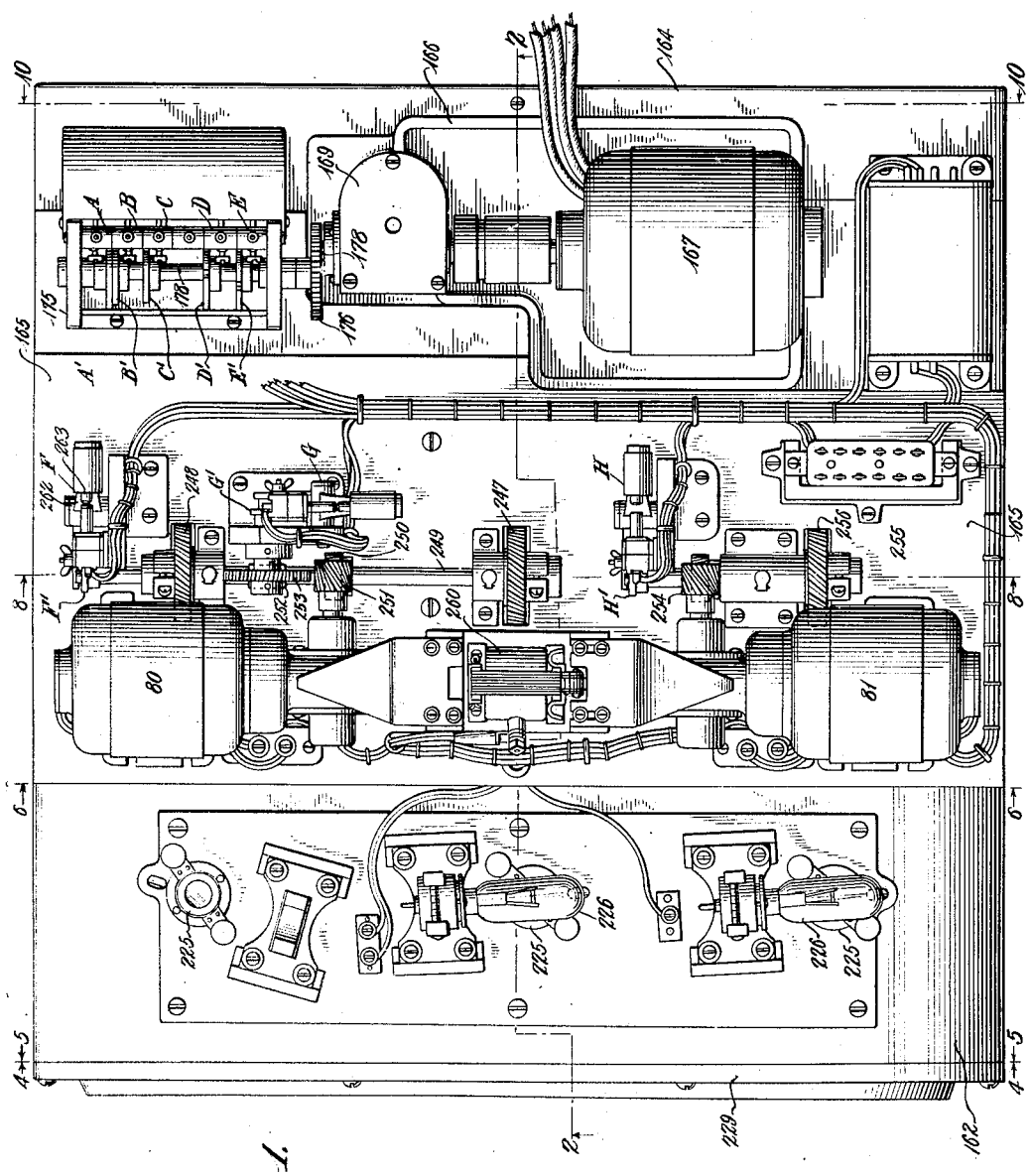
Figure 1 is a plan view.
Figure 2:
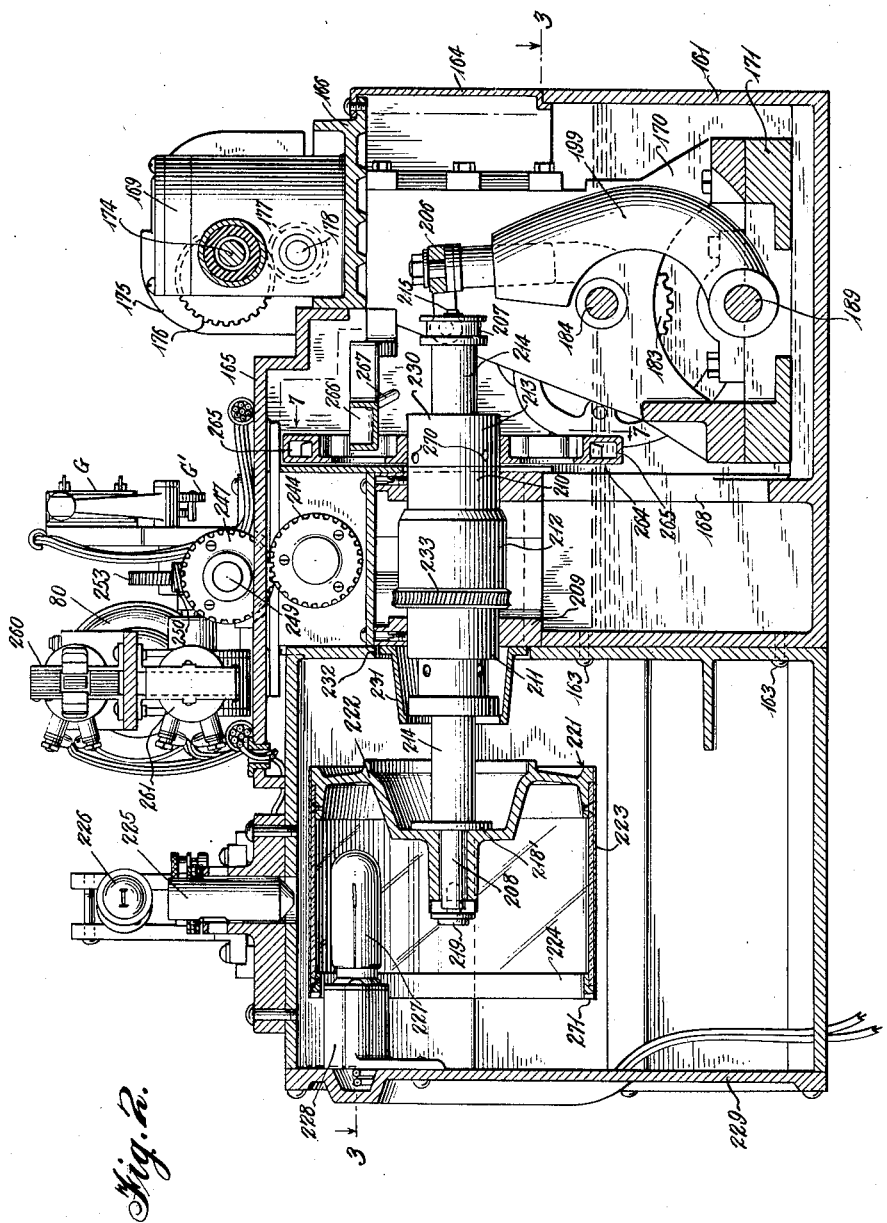
Fig. 2 is a vertical section on line 2—2 of Figure 1.
Figure 3:
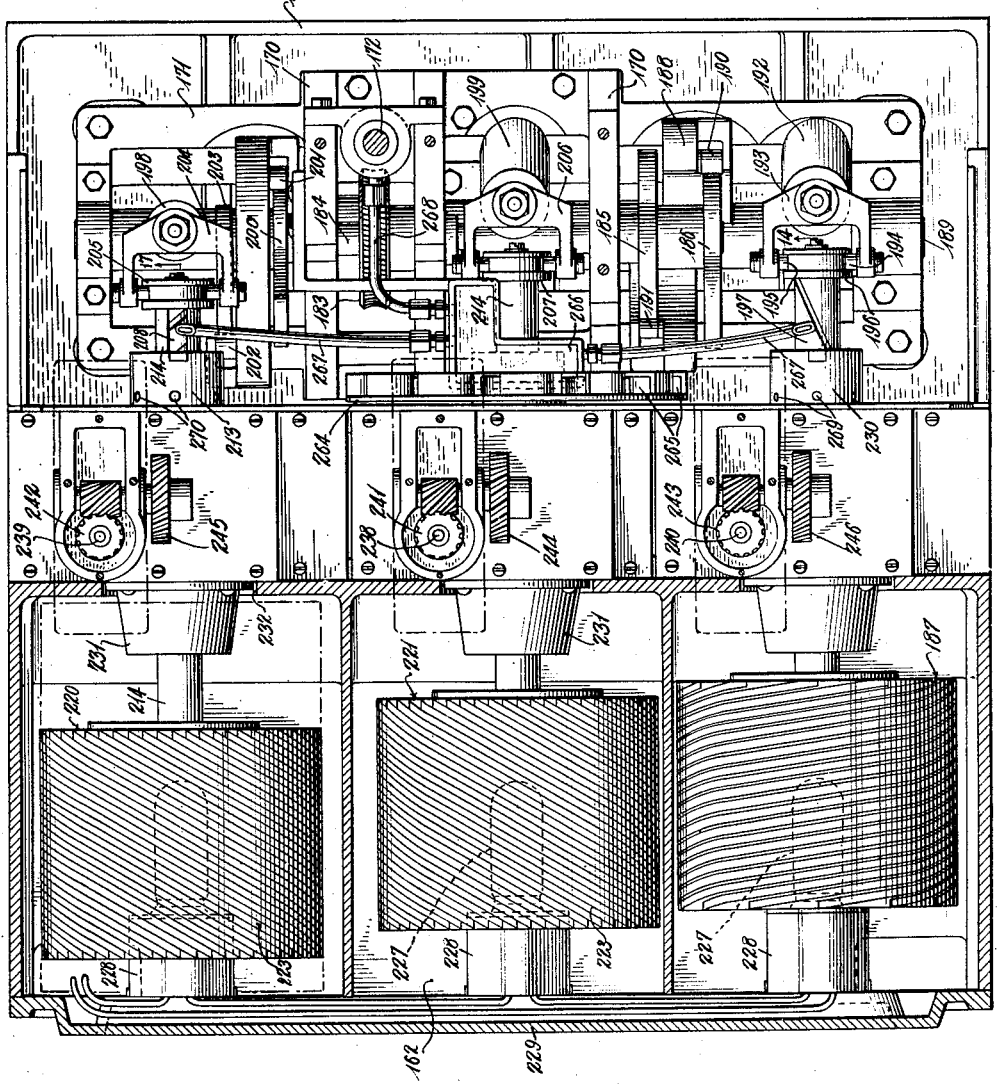
Fig. 3 is a horizontal section on line 3—3 of Figure 2.

The phrase record and minute record grooved shafts 208 are similar and the structure for driving the record is shown in Figure 14 as comprising fixed bearings 209 seated in the frame of the reservoir 161, as shown in Figure 2, with sleeves 210, 211 spaced apart at their inner ends to coact with a sleeve 212 clamped upon a sleeve 213 revoluble in the bearings 210, 211. The grooved shaft 208 is shown as revoluble in a hollow shaft 214, which is slidably mounted in the sleeve 213. The shafts 208 and 214 slide together but the shaft 208 revolves by virtue of the revolution of the connecting pin 215 in the structure of the grooved disc 205.

Fixed upon the sleeve 213 there are oppositely projecting feathers 216, 217 projecting into a spiral groove 218 in shaft 208 by reason of which fact when the shafts 208 and 214 are propelled longitudinally by means of lever 198 or 199 the shaft 208 will revolve.

Mounted upon the end of the grooved shaft 208 between the flange 218' fixed on the shaft and a washer 219 removably secured upon the shaft, are the record bearing cylinders 220, 221, the structure of which cylinders is shown in section in Figure 2 as comprising a metal drum 222 carrying a cylinder of transparent material, as glass, 223, having an outer metallic rim 224 within its open end.

Spirally mounted upon the cylinders 187, 220 and 221 are phonograph sound records as for instance those cut from the sound record of a moving picture film, which are prepared to speak the desired announcements and the pitch of the groove 218 in the shaft 208 is such that travel of the record along its axis will be exactly matched by rotation about the axis to keep a given record strip directly under an optical system 225 (Figure 2), through which one of the exciter lamps 226 shines to impinge upon a photoelectric cell 227 shown as carried by a socket 228 borne by the inner surface of the cover plate 229, which bolts against the face of the record housing 162.

The hour-carrying grooved shaft 197 as shown in Figure 17 slides directly in the sleeve 230 and is provided with feathers and a sleeve 212 in the same manner as already described.

Surrounding the sliding shaft there are shown cones 231 screwing against the bearing structure 209 the bases of which cones seat within openings 232 in the inner wall of the record housing 162.

Figure 8:
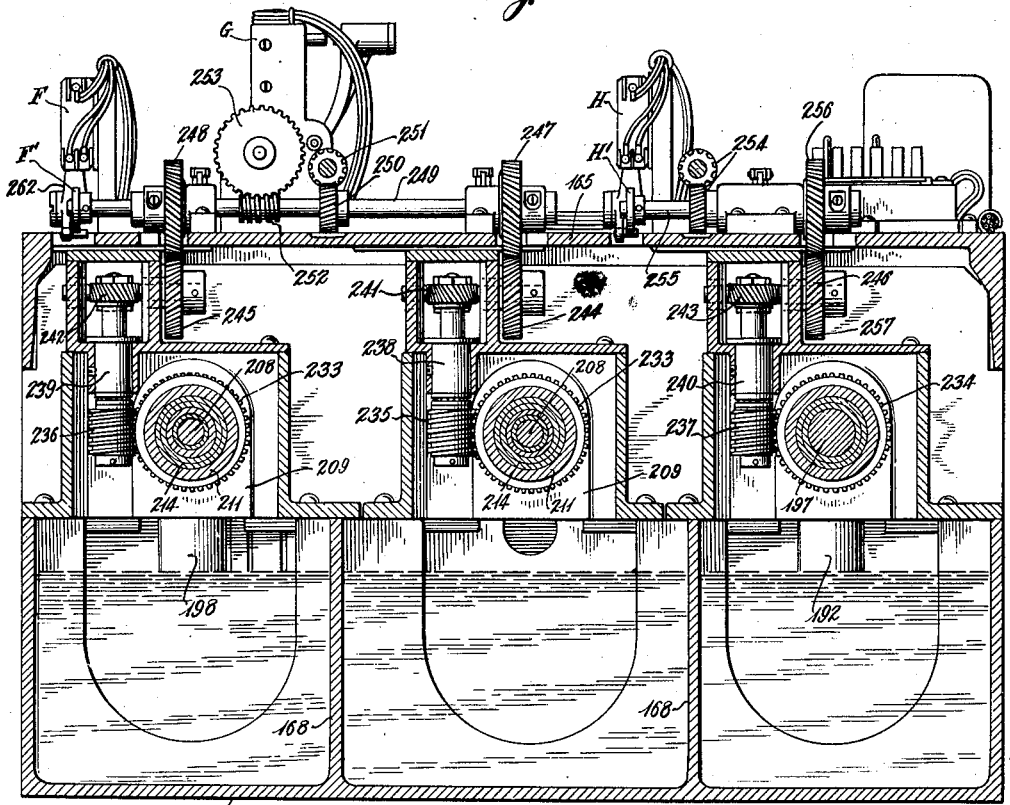
Fig. 8 is a vertical section on line 8—8 of Figure 1.
Figure 9:
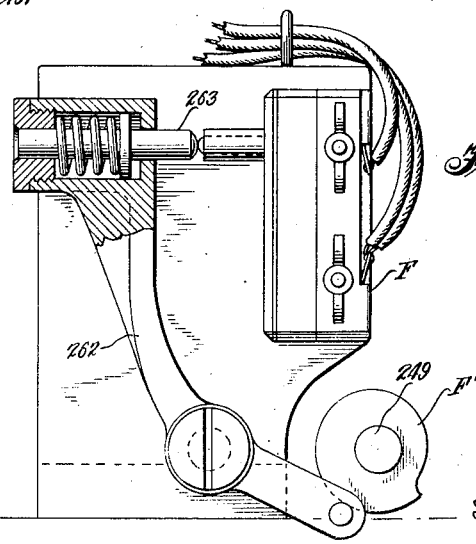
Fig. 9 is a side elevation upon an enlarged scale of a switch operating means and its operating cam partially in section.

To revolve the sleeves 213 about their axes one-sixtieth of a revolution at the beginning of each minute in the case of the minute and phrase record-carrying shaft and one-twelfth of its revolution each hour in the case of the hour-carrying shaft, there are shown worm gears 233 upon the sleeve 212 of shaft 208 and 234 upon the sleeve 212 of shaft 197, which worm gears mesh with worms 235, 236, 237, Figure 8, mounted upon shafts 238, 239, 240.

Shafts 238, 239, 240 are driven respectively by worm gears 241, 242, and 243 through the medium of worm gears 244, 245, and 246. The first named worm gears are driven respectively by worm gears 247, 248, mounted upon the shaft 249 driven by the minute motor 80 through worm gears 250, 251 shown in Figure 8. The shaft 249 also carries a cam F″ to drive the switch F the action of which has been described in the description of the system.

Mounted upon shaft 249 is a worm 252 driving a worm wheel 253 which actuates a cam G′ (Figure 2) for actuation of the switch G, the drive of gears 252, 253 being so regulated that the cam G′ will be actuated once for each sixty revolutions of the cam F″. As has already been explained, the actuation of the switch G will initiate action of the hour motor 81 which through worm gears 254 will drive shaft 255 and which shaft through gears 256, 257 will actuate the hour shifting worm wheel 234.

The resistance to back drive through the worm and worm wheel gearing through the shaft 234 is such that the sleeve 230 will be held stationary while the grooved shafts 197 and 208 are revolved therein upon their lengthwise movement and the actuation of the gears 233 one-sixtieth of a revolution each minute will bring a new sound record under the light system 225, 226 at each shift, the same being true of shaft 234 one-twelfth of a revolution at the beginning of each hour.

Arranged opposite the end of each of the minute and the hour motor, there are shown solenoid operated brakes 258, 259. To ensure that the motors do not move when the current is off from them, the solenoids 260, 261 for these brakes are in parallel with the current to the motors. As already explained in connection with the description for the system, the mechanisms for operating the switches F, G, and H are similar and are illustrated for switch F in Figure 9 as comprising a bell crank 262, one arm of the bell crank being actuated by cam F″ and the remaining arm carrying a spring-pressed plunger 263 for actuation of the switch.

To lubricate all enclosed portions of the mechanism there is shown an oil elevating wheel 264, Figure 7, mounted upon the sleeve 230 of the phrase motor, the cups 265 upon the lower portion of the wheel dipping into the oil in the reservoir and elevating the oil to pour the same into a pan 266 from which it is delivered by spouts 267 to the various bearings of the working parts, one of the spouts being shown at 268 as delivering oil to the interior bearings of the shaft 172, Figure 13.

It will be understood that a spout 267 is carried to a position over each of shafts 208 and over shaft 197 and these deliver oil to the openings 269, 270 which are provided at various points about the periphery of the sleeve as shown in Figure 2.

The record cylinders are desirably formed of smooth surfaced glass and the record strips are engaged into notches 271 and placed in their spiral relation from the one end to the other to engage from the notch at which they are started to the notch for the opposite end of each strip.

The system has been described for use over the usual telephone system where the telephone company does not allow any direct circuit connection with its lines of any extraneous device. It is obvious that the system may be utilized for remote control over a pair of wires other than telephone wires.

For such use a speaker may be provided at the control station with a push button in parallel therewith. A source of current could be supplied either at the control station or at the central station for operation of relay S, or the wires 30, 32 could be connected to operate the relay S. T. directly from the control station.

The pair of wires referred to may be connected directly to the power amplifier 69 omitting the induction coil 72 or the latter could be used to impress the speech vibrations on the control wires.

Therefore where telephone wires and "telephone call" are recited in the following claims, the terms are intended to include the above arrangement.

In brief, the functions of important parts of the system are as follows:

Relay S. T. operates relay C. W. putting starting current on the drive motor.

Switch A operates relay L. C. lifting the receiver and placing voice current on coil 72.

Switch B places a hold-up circuit on relay L. C. and operates relay B. R. which later closes a cycle completing circuit through the drive motor by way of armature 1 of relay C. W.

Relay B. R. operated also breaks the starting circuit to the minute motor 80 preventing its actuation during announcement.

Relay C. O. actuated by either switch M′ or T. D. breaks the return circuit from the drive motor.

Relay C. C. O.—1 shifts the control circuits from the normally acting machine to the spare machine when it together with C. C. O. is operated through either relay T. D. or switch M′.

Relay C. C. O. supplies a hold-up circuit for itself and relay C. C. O.—1 from key 132, and reverses the speech circuits.

Relay C. O. C. operated when relay C. W.—1 is energized closes a circuit for relay C. O. C.—1 from relay T. D. or switch M′ upon failure of the second or spare machine.

Relay C. O. C.—1 operated closes a hold-up circuit for itself and breaks the hold-up circuit for relays C. C. O. and C. C. O.—1 to shift the circuits back to the number one machine. However machine number one cannot be automatically returned to use unless key 119 is first operated, after servicing of the number one machine has taken place, to break the hold-up circuit to relay C. O.

Closing of key 154 alone will actuate relays C. O., C. C. O., and C. C. O.—1 to manually shift the circuits to the spare machine, and the circuits may be manually returned by simultaneous operation of keys 158, 137, 129, 121, 150, and 147.

In the above description, and in the present preferred use of the machine, one set of sound records is utilized to announce a phrase. However the three cylinders shown may be used to announce the hour, minute and nearest 10 or 15 seconds of the minute. In such use the clock motor would cause shifting of the second record at appropriate intervals, operation of which would at each six or four changes cause shift of the minute record by means acting as shown from the minute shift. The minute motor would then actuate the hour shift as described above.

Minor changes in the physical embodiment of the system or of the announcing mechanism may be made within the scope of the appended claims without departing from the spirit of the invention.

I claim:

1. A time announcing system comprising, in combination: announcing mechanism; means to cause the announcement by said mechanism to be audible over a telephone talking circuit; a motor to drive said mechanism; a relay responsive to ringing current over said telephone circuit individual to said circuit; means actuated by said relay to provide starting current for said motor; a switch closed by initial operation of said motor; means actuated by said switch to close the talking circuit of said telephone; means actuated by continued operation of said motor to maintain the closed condition of said talking circuit during an announcing cycle of operation of the mechanism and acting to break the circuit through said relay.

2. A time announcing system comprising, in combination: a plurality of telephone sets; relays individual to each of said sets; a relay common to said sets; means actuated by ringing current over a set acting to energize one of said individual relays; means actuated by the operated relay to energize said common relay; announcing mechanism; a motor for drive thereof; means actuated by the operated common relay to provide starting current for said motor; a switch closed by initial operation of said motor, acting to energize the remaining individual relay and to close the talking circuit of the set.

3. The combination of claim 2 with a second switch actuated by said motor; and means actuated by said second switch to provide a cycle completing circuit through the motor and a hold-up circuit on the second named individual relay and said talking circuit closing means; the last named switch being automatically opened upon completion of a cycle.

4. The combination of claim 2 with means to prevent energization of the second named individual relay and the talking circuit closing means by actuation of the first named individual relay during announcing operation of the mechanism.

5. The combination of claim 2 with a second switch closed by continued operation of the motor with substantially simultaneous opening of the first named switch; a second relay common to the sets energized by closing of the second switch acting to close a hold-up circuit for the first named relay to maintain a circuit for operation of the motor; opening of the first named switch acting to break the circuit for energization of the second named individual relay of the non-calling sets.

6. An announcing system comprising, in combination: a plurality of announcing mechanisms; electrical circuits for setting said mechanisms into operation responsive to a telephone call, and for impressing speech vibrations from said mechanism upon the calling telephone apparatus, said circuits normally connected to one of said mechanisms, and means acting automatically upon failure of said one mechanism to shift the circuits to the remaining mechanism.

7. The combination of claim 6 with means to automatically return the circuits to the first machine upon failure of the second machine to function properly.

8. The combination of claim 6 with means to automatically return the circuits to the first machine; a manually controlled key; and means to prevent such automatic return until said key has been manually actuated.

9. The combination of claim 6 with means to automatically return the circuits to the first mechanism upon failure of the second mechanism to function properly; and manually controlled means to prepare for operation of said automatic means; whereby the circuits cannot be returned until attention of an attendant is had.

10. An announcing system comprising, in combination: a plurality of announcing mechanisms; electrical circuits normally connecting one of said mechanisms for initiating operation thereof by a calling telephone circuit and for impressing speech vibrations on said telephone circuit; manually controlled means to cause shifting of the circuit connections to another of said mechanisms and manually controlled means to cause return of the circuit connections to said first machine.

11. An announcing system comprising, in combination: a plurality of announcing mechanisms, a drive motor for each of said mechanisms, electrical circuits for setting said motors into operation responsive to a telephone call and for impressing speech vibrations from said mechanisms upon the calling telephone apparatus; said circuits normally connected to one of said mechanisms; means acting when energized to break the power circuit of the motor of the normally operating mechanism; and means acting when energized to shift the voice and control circuits to the remaining mechanism.

12. The combination of claim 11 with manually controlled keys in the energizing circuits of said relays to restore the circuit connections to the normally operated machine.

13. The combination of claim 11 with a power circuit breaking relay associated with each of said mechanisms connected to break the circuit of the motor of the remaining mechanism and means to shift the circuits for telephone control and speech impression from the remaining mechanism to the first named mechanism.

14. A time announcing system comprising, in combination: a plurality of time announcing mechanisms including means each to announce the minute of the hour; means to impress the announcement upon a telephone circuit; means to connect circuits from a telephone instrument to said mechanisms normally connected to one thereof; a motor to shift the minute announcing record once each minute; means in parallel with the said minute motor operating therewith; and means actuated by said second means upon failure of said minute motor, acting to shift the control circuits and the voice circuits from the normally operating mechanism to a remaining announcing mechanism.

15. An announcing system comprising, in combination: a plurality of announcing mechanisms; means for telephonic circuit control of said mechanism normally connected to one thereof; means actuated by said mechanisms to impress speech vibrations upon the circuits of the telephone system; a relay acting upon failure of the voice vibrations in the speech impressing circuits to shift the control circuits and the voice impressing circuits from the normally acting mechanism to a remaining mechanism.

16. The combination of claim 14 with means in parallel with said speech impressing circuits opening and closing a contact by variation in the speech vibrations; delayed action means in circuit with the first named means acting upon failure of said vibrations for a definite period to shift the control circuits and the speech impressing circuits to a remaining mechanism.

17. An announcing system comprising, in combination: mechanism to make telephoned announcement of time comprising a minute record; a clock motor; a spare clock motor; means acting once each minute to shift the minute record controlled by said clock motor; and means actuated upon failure of said clock-motor-control-means to cut in said spare clock motor.

18. A time announcing system comprising, in combination: an announcing mechanism having a sound record each for announcing the minutes and the hours, a motor to shift the minute record once each minute; means controlled by the minute motor to shift the hour motor once each hour; a synchronous clock motor; a switch controlled thereby to energize said minutes shifting means once each minute; a second synchronous motor in parallel with said clock motor; a spare clock motor; means controlled by said second synchronous motor actuated upon failure of said first named synchronous motor to remove said motor from control of the minute shifting means and to connect the spare clock motor for such control.

19. The combination of claim 18 with a manually operated normally closed key in the energizing circuit of said relay whereby to return the circuits to the first named clock motor.

20. A time announcing system comprising, in combination: minute and hour announcing records; a motor for shifting each of said records once each minute and once each hour respectively; the hour motor controlled by the minute motor; a clock motor; a spare clock motor; a synchronous motor connected in parallel with the first named clock motor; a switch actuated by said synchronous motor acting upon failure of said clock motor; a relay actuated by the switch of said synchronous motor to shift the minute motor control circuits from said clock motor to said spare clock motor and to break the circuits to said clock motor.

21. The combination of claim 20 with means whereby said spare clock motor normally stands in a partially completed cycle whereby to take up the control of the minute motor without loss of one minute of time.

22. A time announcing system comprising, in combination: announcing mechanism including minute and hour announcing phonographic records; a minute motor for changing the minute record once each minute; means controlled by the minute motor to energize the hour motor once each hour to cause change of the hour record; a synchronous clock motor; a relay actuated thereby to place a hold-up circuit for itself; a second relay actuated by closure of a contact of the first named relay to close a path for starting circuit to said motor; a second relay actuated directly by said clock motor to provide a hold-up circuit for said second named relay; means actuated by said mechanism to break the starting circuit of said minute motor during an announcing cycle of the mechanism acting to restore shift circuit to said minute motor at the end of each announcing cycle.

23. A time announcing machine comprising, in combination: minute and hour phonographic records; a minute motor for changing said minute record once each minute; an hour motor for changing said hour record once each hour; a switch controlled by said minute motor acting after initial operation thereof to close a cycle completing circuit through the motor; a second switch controlled by the minute motor acting upon initial operation to close an initial circuit to said hour motor; a switch controlled by the hour motor acting after initial operation thereof to close a cycle completing circuit to the hour motor.

24. An announcing machine comprising, in combination: a cylinder, a phonographic record spirally mounted thereon; stationary means to reproduce the speech represented by said record; means to move said cylinder axially; and means to cause revolution of the cylinder in timed relation to its axial movement to preserve the correct relation between said stationary reproducing means and said moving spiral record.

25. An announcing machine comprising, in combination: a plurality of hollow transparent cylinders; a photoelectric cell in fixed relation with a wall of each of said cylinders an exciter lamp upon the remaining side of each of said walls in fixed relative relation to said cell for excitation thereof; a phonograph record spirally mounted upon each of said cylinders; a photographic sound record spirally arranged upon each of said cylinders to be penetrated by rays of said exciter lamp; means to move said cylinders axially and sequentially; and means to revolve said cylinders during the axial movement in timed relation to cause the rays of said exciter lamp to continuously pass through said record; the sequential movement of said records being such as to cause continuous flow of words from said plurality of records.

26. An announcing machine comprising, in combination: a plurality of spirally grooved shafts; a sleeve slidably carrying each of said shafts; a feather carried by said sleeves projecting into said groove whereby longitudinal movement of the shaft will cause rotation thereof; a transparent hollow cylinder carried by each of said shafts; a photographic sound record spirally mounted upon each of said cylinders; the pitch of said spirals being the same as that of the spiral grooves respectively; a photoelectric cell and exciter lamp, one thereof in fixed position within said cylinder and the other thereof in fixed position exteriorly of said cylinder whereby the rays of said lamp passing through said sound record shall impinge upon its corresponding cell; means for causing longitudinal movement of said shaft; and means whereby the longitudinal movement of respective shafts occurs in sequence to cause continuous flow of words from successive records.

27. A time announcing mechanism comprising, in combination: a hollow transparent cylinder; 60 phonographic sound records spirally mounted upon said cylinder in multiple screwthread relation to announce the minutes of the hour; a second transparent cylinder; 12 phonographic sound records spirally mounted thereon in multiple screwthread relation to announce the hours; means to cause axial and rotational movement of said cylinders in sequence, the rotation of each being timed in accordance with its axial movement to move an individual records always opposite a fixed point; reproducing means acting at said fixed point of each record; means to cause revolution of the minute record about its axis without longitudinal movement once each minute through a 6° arc; and means to cause revolution of the hour record about its axis without longitudinal movement through an arc of 30° once each hour.

28. A phonographic announcing machine comprising, in combination: a spirally grooved shaft mounted for sliding and rotational movement; a feather projecting into the groove of said shaft to cause revolution of the shaft in timed relation with longitudinal movement thereof; a grooved disk fixed upon said shaft; a bell crank; a pin carried by one arm of said bell crank projecting into the groove of said disk; a cam actuating the remaining arm of said bell crank; means to revolve said cam; a record cylinder mounted on said shaft coaxially therewith; a sound record spirally carried by said cylinder; the pitch of the spiral of the record and groove being equal whereby said record will remain opposite a fixed point during movement of the shaft; and a sound reproducer coacting with said record at said fixed point.

29. The combination of claim 28 with a plurality of sound records in multiple screwthread relation on the shaft; and means to move said feather to change the record moving opposite said fixed point.

30. An announcing machine comprising in combination: a plurality of record-carrying members; 60-minute records carried by one of said members; 12-hour records carried by another of said members; a plurality of phrase records carried by a remaining member equal in movement to one of said first named members; means to impress speech vibrations from said members upon a telephone circuit sequentially to provide a continuous coherent flow of words; and means to change said records at definite intervals.

31. The combination of claim 30 in which the movement of the phrase records on the phrase carrying member equals the movement of the records on one of the remaining members, and in which the record changing means simultaneously changes the phrase record and the equal-movement-record-carrying member.

32. An announcing machine comprising; in combination: a plurality of photographic sound records; an exciter lamp for each record; means to energize said lamps and to produce sound from said records in succession; a plurality of sources of current for energizing said lamps; and means whereby each successive lamp is energized from a source of current different from the preceding lamp of the succession.

33. The combination of claim 32 in which said sources of current comprise two secondary coils influenced by the primary coil of a transformer, and in which the energizing means comprise a series of switches successively actuated to connect the sources of current alternately to the successive lamps.

34. An announcing system comprising, in combination: a plurality of announcing mechanisms; electrical circuits for setting said mechanisms into operation responsive to a telephone call, and for impressing speech vibrations from said mechanism upon the calling telephone apparatus, said circuits normally connected to one of said mechanisms; and manually operable means to cause shifting of circuits from one machine to the other without interruption of service.

35. A time announcing system comprising, in combination: a plurality of time announcing mechanisms each including means to announce the minute of the hour; means to impress the announcement upon a telephone circuit; means to connect circuits from the telephone to said mechanisms normally connected to one thereof; motors included in the respective mechanisms to shift the minute announcing records of each mechanism once each minute; a clock motor; means controlled by said clock motor to cause shifting operation of each of said minute motors once each minute; and means to cause shifting of the telephone circuit connections from said one mechanism to another thereof; whereby when such shifting occurs said another mechanism will at once give correct time announcement over the telephone circuits.

36. The combination of claim 35 in which said shifting means act automatically upon failure of said one mechanism to function properly.

JOHN L. FRANKLIN.